(12) United States Patent
Tabata (10) Patent No.: US 11,798,294 B2
(45) Date of Patent: Oct. 24, 2023

(54) VEHICLE RECORDING CONTROL DEVICE, VEHICLE RECORDING DEVICE, VEHICLE RECORDING CONTROL METHOD, AND COMPUTER PROGRAM

(71) Applicant: JVCKENWOOD Corporation, Yokohama (JP)

(72) Inventor: Kiyofumi Tabata, Yokohama (JP)

(73) Assignee: JVCKENWOOD Corporation, Yokohama (JP)

( * ) Notice: Subject to any disclaimer, the term of this patent is extended or adjusted under 35 U.S.C. 154(b) by 713 days.

(21) Appl. No.: 16/999,114

(22) Filed: Aug. 21, 2020

(65) Prior Publication Data

US 2020/0410258 A1 Dec. 31, 2020

Related U.S. Application Data

(63) Continuation of application No. PCT/JP2019/023078, filed on Jun. 11, 2019.

(30) Foreign Application Priority Data

Dec. 26, 2018 (JP) ................. 2018-243051

(51) Int. Cl.
G06K 9/00 (2022.01)
G06V 20/56 (2022.01)
(Continued)

(52) U.S. Cl.
CPC ............ *G06V 20/588* (2022.01); *G06V 20/40* (2022.01); *G07C 5/0841* (2013.01)

(58) Field of Classification Search
CPC .................................................... G06V 20/40
See application file for complete search history.

(56) References Cited

U.S. PATENT DOCUMENTS

2009/0136141 A1* 5/2009 Badawy ................. G06V 20/40
382/225
2014/0111647 A1* 4/2014 Atsmon .................. G08G 1/14
348/148

(Continued)

FOREIGN PATENT DOCUMENTS

JP 2006-321357 11/2006
JP 2014-236492 12/2014

OTHER PUBLICATIONS

International Search Report and Written Opinion for International Application No. PCT/JP2019/023078 dated Aug. 13, 2019, 9 pages.

(Continued)

*Primary Examiner* — Hadi Akhavannik
(74) *Attorney, Agent, or Firm* — AMIN, TUROCY & WATSON, LLP (57) ABSTRACT

Provided are a video data acquisition unit that acquires video data; a parking detection unit that detects whether the vehicle is parked; a moving body detection unit that detects a moving body from video data while the vehicle is parked; an acceleration detection unit that detects acceleration applied to the vehicle; a parking position determination unit that determines whether the vehicle is parked at a location where people or vehicles often pass close to the vehicle, based on position information of the vehicle; and a recording function control unit that selectively performs a process of storing video data based on detection of a moving body by the moving body detection unit, and a process of storing video data based on acceleration detected by the acceleration detection unit, according to a determination result of the parking position determination unit.

9 Claims, 3 Drawing Sheets

(51) Int. Cl.
*G07C 5/08* (2006.01)
*G06V 20/40* (2022.01)

(56) References Cited

U.S. PATENT DOCUMENTS

| | | | | |
|---|---|---|---|---|
| 2016/0096506 | A1* | 4/2016 | Shreve | B60R 25/102 |
| | | | | 348/148 |
| 2019/0130736 | A1* | 5/2019 | Silver | G05D 1/0246 |
| 2019/0258251 | A1* | 8/2019 | Ditty | G06N 3/063 |

OTHER PUBLICATIONS

Extended European Search Report for European Patent Application No. 19905103.8 dated Apr. 30, 2021.

\* cited by examiner

VEHICLE RECORDING CONTROL DEVICE, VEHICLE RECORDING DEVICE, VEHICLE RECORDING CONTROL METHOD, AND COMPUTER PROGRAM

CROSS-REFERENCE TO RELATED APPLICATION(S)

This application is a Continuation of PCT international application Ser. No. PCT/JP2019/023078 filed on Jun. 11, 2019 which designates the United States, incorporated herein by reference, and which claims the benefit of priority from Japanese Patent Application No. 2018-243051, filed on Dec. 26, 2018, incorporated herein by reference.

BACKGROUND

1. Technical Field

The present disclosure relates to a vehicle recording control device, a vehicle recording device, a vehicle recording control method, and a computer program.

2. Description of the Related Art

There is a vehicle recording device including a parking recording function for recording an event that occurs while a vehicle is parked using video images. A technology that records video images by detecting a moving body while a vehicle is parked and the like is known.

When parking recording is performed by detecting a moving body while a vehicle is parked, people or vehicles that have passed through an image capturing direction are detected as moving bodies. Consequently, a large number of unnecessary event recorded data are recorded, and the recording capacity may become insufficient.

SUMMARY

It is an object of the present disclosure to at least partially solve the problems in the conventional technology.

To solve the above problem and achieve the above object, a vehicle recording control device according to the present disclosure, comprising: a video data acquisition unit that acquires video data captured by an image capturing unit for capturing an image of a surrounding of a vehicle; a parking detection unit that detects whether the vehicle is parked; a moving body detection unit that detects a moving body from the video data acquired by the video data acquisition unit while the vehicle is parked; an acceleration detection unit that detects acceleration applied to the vehicle; a parking position determination unit that determines whether the vehicle is parked at a location where people or vehicles often pass close to the vehicle, based on position information of the vehicle, and a recording function control unit that selectively performs a process of storing video data based on detection of a moving body by the moving body detection unit, and a process of storing video data based on acceleration detected by the acceleration detection unit, according to a determination result of the parking position determination unit.

A vehicle recording device according to the present disclosure, comprising: the vehicle recording control device above; and at least one of an image capturing unit that captures an image of a surrounding of a vehicle, and a recording unit that stores video data.

A vehicle recording control method according to the present disclosure, comprising: a step of detecting parking that detects whether a vehicle is parked; a step of determining parking position that determines whether the vehicle is parked at a location where people or vehicles often pass close to the vehicle, based on position information of the vehicle; and a step of controlling recording function that selectively performs a process of storing video data based on detection of a moving body from video data obtained by capturing an image of a surrounding of the vehicle, and a process of storing video data based on detecting acceleration applied to the vehicle, according to a determination result at the step of determining parking position.

A non-transitory computer readable recording medium storing therein a computer program according to the present disclosure that causes a computer operating as a vehicle recording control device to execute: a step of detecting parking that detects whether a vehicle is parked; a step of determining parking position that determines whether the vehicle is parked at a location where people or vehicles often pass close to the vehicle, based on position information of the vehicle; and a step of controlling recording function that selectively performs a process of storing video data based on detection of a moving body from video data obtained by capturing an image of a surrounding of the vehicle, and a process of storing video data based on detecting acceleration applied to the vehicle, according to a determination result at the step of determining parking position.

DETAILED DESCRIPTION

Hereinafter, embodiments of a vehicle recording control device, a vehicle recording device, a vehicle recording control method, and a computer program according to the present disclosure will be described in detail with reference to the accompanying drawings. However, the present disclosure is not limited to the following embodiments.

Figure 1:
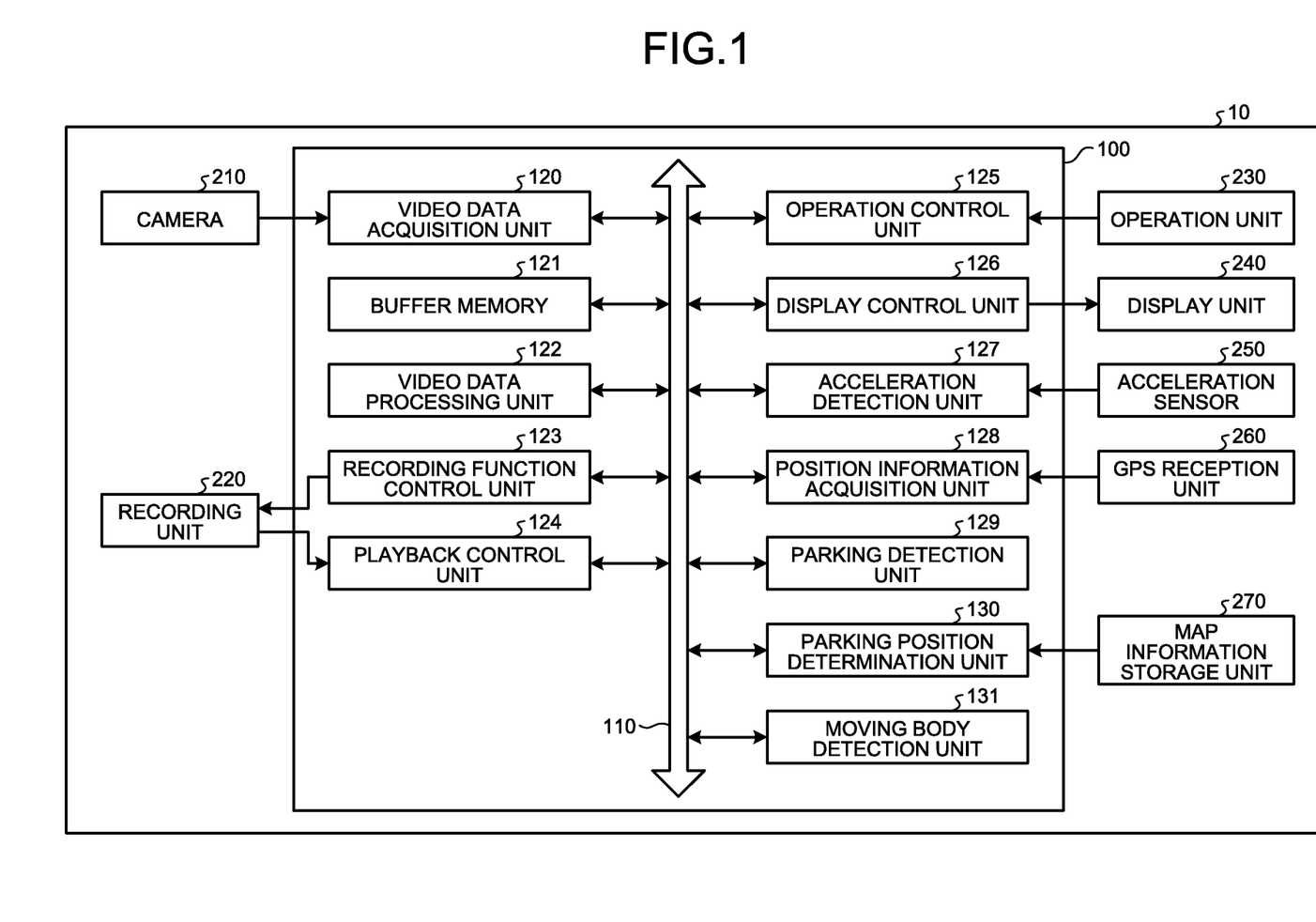
FIG. 1 is a block diagram illustrating a configuration example of a vehicle recording device including a vehicle recording control device according to the present embodiment.

FIG. 1 is a block diagram illustrating a configuration example of a vehicle recording device including a vehicle recording control device according to the present embodiment. A vehicle recording device 10 performs different parking recording functions depending on when a vehicle is parked at a location where people or vehicles often pass close to the vehicle, or when a vehicle is parked at a location where people or vehicles seldom pass close to the vehicle.

The vehicle recording device 10 may be mounted on a vehicle, or may be a portable device that can be used in a vehicle. The vehicle recording device 10 may also be implemented including the functions or components of a device installed in advance in the vehicle, a navigation device, and the like. The vehicle recording device 10 includes a camera (image capturing unit) 210, a recording unit 220, an operation unit 230, a display unit 240, an acceleration sensor 250, a global positioning system (GPS)

reception unit 260, a map information storage unit 270, and a vehicle recording control device 100.

The camera 210 is a camera for capturing images of the surroundings of a vehicle. In the present embodiment, the camera 210 is a camera that can capture images of the whole sky of 360 degrees. However, it is not limited thereto, and the camera 210 may also be a single camera facing a single direction, or a group of cameras that capture images of various directions. For example, the camera 210 is disposed in front of the vehicle interior of a vehicle. In the present embodiment, for example, when the accessory power supply is OFF, in other words, while the vehicle is parked, upon detecting an event, the camera 210 can store video images of a predetermined period for about several tens of seconds. The camera 210 outputs the captured video data to a video data acquisition unit 120 in the vehicle recording control device 100. For example, the video data is a moving image configured by images of 30 frames per second.

The recording unit 220 is used for temporarily storing data in the vehicle recording device 10. For example, the recording unit 220 is a recording unit such as a semiconductor memory element including a random access memory (RAM), a flash memory, and the like, or a memory card. Alternatively, the recording unit 220 may also be an external recording unit wirelessly connected via a communication device, which is not illustrated. The recording unit 220 records loop recorded video data or event recorded data, on the basis of a control signal output from a recording function control unit 123 in the vehicle recording control device 100.

The operation unit 230 accepts various operations on the vehicle recording device 10. For example, the operation unit 230 accepts an operation for manually storing the captured video data in the recording unit 220, as the event recorded data. For example, the operation unit 230 accepts an operation for playing back the loop recorded data or the event recorded data recorded in the recording unit 220. For example, the operation unit 230 accepts an operation for eliminating the event recorded data recorded in the recording unit 220. For example, the operation unit 230 accepts an operation for finishing loop recording. The operation unit 230 outputs the operation information to an operation control unit 125 in the vehicle recording control device 100.

For example, the display unit 240 is a display device dedicated to the vehicle recording device 10, a display device used in common with another system including a navigation system, or the like. The display unit 240 may also be integrally formed with the camera 210. For example, the display unit 240 is a display including a liquid crystal display (LCD), an organic electro-luminescence (EL) display, or the like. In the present embodiment, the display unit 240 is disposed on a dashboard, an instrumental panel, a center console, or the like in front of the driver of the vehicle. On the basis of a video signal output from a display control unit 126 in the vehicle recording control device 100, the display unit 240 displays video images. The display unit 240 displays the video images captured by the camera 210, or the video images recorded in the recording unit 220.

The acceleration sensor 250 is a sensor for detecting acceleration generated on the vehicle. The acceleration sensor 250 outputs a detection result to an acceleration detection unit 127 in the vehicle recording control device 100. For example, the acceleration sensor 250 is a sensor for detecting the acceleration in the three-axial directions. The three-axial directions include the front-rear direction, the left-right direction, and the up-down direction of the vehicle.

The GPS reception unit 260 receives radio waves from a GPS satellite, which is not illustrated. The GPS reception unit 260 outputs the received radio wave signal to a position information acquisition unit 128 in the vehicle recording control device 100.

The map information storage unit 270 stores therein map information. For example, the map information is a road map including intersections. For example, the map information includes information relating to a busy street crowded with people such as a downtown area, or information relating to a road with heavy traffic. Moreover, for example, the map information includes facility information including information on parking lots. For example, the map information includes information whether the parking lot is facing a busy street crowded with people such as a downtown area, or facing a road with heavy traffic. The map information storage unit 270 outputs the stored map information to a parking position determination unit 130. The map information storage unit 270 may also be a storage device such as an external server that acquires map information via a communication function, which will not be illustrated.

For example, the vehicle recording control device 100 is an arithmetic processing device (control device) configured of a central processing unit (CPU) and the like. The vehicle recording control device 100 loads the stored computer program into a memory, and executes a command included in the computer program. The vehicle recording control device 100 includes an internal memory, which is not illustrated, and the internal memory is used for temporarily storing data in the vehicle recording control device 100, and the like. The vehicle recording control device 100 includes the video data acquisition unit 120, a buffer memory 121, a video data processing unit 122, the recording function control unit 123, a playback control unit 124, the operation control unit 125, the display control unit 126, the acceleration detection unit 127, the position information acquisition unit 128, a parking detection unit 129, the parking position determination unit 130, and a moving body detection unit 131 connected to a bus 110.

The video data acquisition unit 120 acquires video data obtained by capturing images of the surroundings of the vehicle. More specifically, the video data acquisition unit 120 acquires the video data output from the camera 210, and outputs the video data to the buffer memory 121.

The buffer memory 121 is an internal memory in the vehicle recording control device 100, and is a memory for temporarily recording video data of a certain period acquired by the video data acquisition unit 120, while the video data is updated.

For example, the video data processing unit 122 converts the video data temporarily stored in the buffer memory 121 to any file format such as MP4 format encoded with any codec including H.264, moving picture experts group (MPEG-4), and the like. The video data processing unit 122 generates video data that is a file of a certain period, from the video data temporarily stored in the buffer memory 121. More specifically, the video data processing unit 122 generates video data of 60 seconds as a file, from the video data temporarily stored in the buffer memory 121, in the recording order. The video data processing unit 122 outputs the generated video data to the recording function control unit 123. Moreover, the video data processing unit 122 outputs the generated video data to the display control unit 126. For example, the period of the video data generated as a file is 60 seconds. However, it is not limited thereto. The video data in this example may also be data including voice in addition to the video images captured by the camera 210.

The recording function control unit 123 controls to cause the recording unit 220 to record the video data converted into a file by the video data processing unit 122. During a period when loop recording is performed, such as when the accessory power supply of the vehicle is ON, the recording function control unit 123 records the video data converted into a file by the video data processing unit 122 in the recording unit 220, as rewritable video data. More specifically, during a period when loop recording is performed, the recording function control unit 123 keeps recording the video data generated by the video data processing unit 122 in the recording unit 220. Then, when the capacity of the recording unit 220 becomes full, the recording function control unit 123 overwrites the oldest video data with new video data, and records the new video data.

Moreover, upon detecting an event, the recording function control unit 123 stores the video data of a predetermined period in the video data generated by the video data processing unit 122, in the recording unit 220, as the event recorded data prohibited from being overwritten.

For example, as for the event recorded data to be stored in the recording unit 220 by the recording function control unit 123, when image capturing is started after an event is detected, video data of a predetermined period of about ten seconds or more to 60 seconds or less after the event is detected and the image capturing is started, is stored as the event recorded data. As for the event recorded data to be stored in the recording unit 220 by the recording function control unit 123, during a period when loop recording is performed, video data of a predetermined period of about ten seconds or more to 60 seconds or less before and after the time when the event is detected, is stored as the event recorded data.

When the accessory power supply of the vehicle is OFF, in other words, while the vehicle is parked, the recording function control unit 123 operates the parking monitoring function, and stores the video data captured by the camera 210. More specifically, the parking monitoring function is used for detecting an event, and storing the video data by loop recording. Alternatively, the parking monitoring function is used for activating the camera 210 after detecting an event, and storing the video data.

When the parking position determination unit 130 determines that the vehicle is parked at a location where people or vehicles seldom pass close to the vehicle, the recording function control unit 123 stores the video data by determining that an event is detected on the basis of the detection of a moving body by the moving body detection unit 131. When people or vehicles seldom pass close by, in other words, when not many people are watching, the vehicle is susceptible to vehicle theft and vandalism. Consequently, it is preferable to store video images upon detecting a moving body close to the vehicle, instead of storing video images after acceleration is detected such as when the vehicle is damaged. When the vehicle is parked at such a location, the frequency of detecting a moving body is lower than when the vehicle is parked at a location where people or vehicles often pass close to the vehicle. Consequently, even when video images are stored upon detecting a moving body close to the vehicle, a large number of moving bodies will not be detected. Thus, it is possible to suppress the recording capacity of video data to be stored.

When the parking position determination unit 130 determines that the vehicle is parked at a location where people or vehicles often pass close to the vehicle, the recording function control unit 123 stores video data on the basis of the acceleration data. When people or vehicles often pass close by, the susceptibility to vehicle theft and vandalism will be reduced. When the vehicle is parked at a location where people or vehicles often pass close by, the frequency of detecting a moving body is greater than when the vehicle is parked at a location where people or vehicles seldom pass close to the vehicle. Thus, when the vehicle is parked at a location where people or vehicles often pass close to the vehicle, the recording function control unit 123 stores the video data by determining that an event is detected on the basis of the acceleration data, instead of detecting a moving body. Consequently, compared to when an event is detected by the detection of a moving body, because a large number of events will not be generated, it is possible to suppress the recording capacity of video data to be stored.

On the basis of a control signal for performing a playback operation output from the operation control unit 125, the playback control unit 124 controls to playback the loop recorded video data or the event recorded data having been recorded in the recording unit 220.

The operation control unit 125 acquires operation information for operation received by the operation unit 230. For example, the operation control unit 125 acquires storage operation information indicating an operation for manually storing video data, playback operation information indicating a playback operation, or erase operation information indicating an operation for erasing video data, and outputs a control signal. For example, the operation control unit 125 acquires finishing operation information indicating an operation for finishing loop recording, and outputs a control signal.

The display control unit 126 controls the display of video data on the display unit 240. The display control unit 126 outputs a video signal for causing the display unit 240 to output video data. More specifically, the display control unit 126 outputs a video signal for displaying the video images captured by the camera 210, or playing back the loop recorded video data or the event recorded data having been recorded in the recording unit 220.

On the basis of the detection result of the acceleration sensor 250, the acceleration detection unit 127 detects the acceleration applied to the vehicle. More specifically, when an acceleration equal to or higher than a threshold is detected in the acceleration detected by the acceleration sensor 250, the acceleration detection unit 127 detects the acceleration as an event. The threshold for detecting an event when parking recording is taking place may be set smaller than a threshold used for detecting an event while the vehicle is traveling. For example, when the threshold of acceleration used for detecting an event while the vehicle is traveling is about 1 G, the threshold of acceleration used for detecting an event when parking recording is taking place may be about 0.3 G.

The position information acquisition unit 128 calculates the current position information of the vehicle, on the basis of radio waves received by the GPS reception unit 260, using a known method.

The parking detection unit 129 detects that the vehicle is in a parking state, on the basis of the information acquired from the vehicle. For example, the vehicle is in a parking state, when the shift position is set to "parking", when the side brake is operated, when the speed becomes zero for five seconds or more, when the engine is stopped, or the like. Alternatively, it is also possible to determine that the vehicle is in a parking state, by any trigger such as user's operation.

The parking position determination unit 130 determines whether the vehicle is parked at a location where people or vehicles often pass close to the vehicle, on the basis of the position information of the vehicle and the map information stored in the map information storage unit 270. For example, when it is determined that the parking position of the vehicle is a parking lot facing a busy street crowded with people such as a downtown area, a road with heavy traffic, or a busy street crowded with people such as a downtown area; or a parking lot facing a road with heavy traffic, the parking position determination unit 130 determines that the vehicle is parked at a location where people or vehicles often pass close to the vehicle.

Moreover, the parking position determination unit 130 may determine that the vehicle is parked at a location where people or vehicles often pass in the image capturing direction of the camera 210, on the basis of the position information and parking direction information of the vehicle. When the vehicle is parked at such a location, a large number of moving bodies may be detected unintentionally from the video data captured by the camera 210. Furthermore, when a location where people or vehicles often pass by is placed in a direction different from the image capturing direction of the camera 210, and when not many people are watching the image capturing direction of the camera 210, the vehicle is susceptible to vehicle theft and vandalism. Consequently, it is possible to make a more appropriate determination, by taking the image capturing direction of the camera 210 into consideration.

Still furthermore, the parking position determination unit 130 may determine whether the vehicle is parked in the vicinity of a road, a sidewalk, or an entrance of a facility, on the basis of the position information of the vehicle and the map information stored in the map information storage unit 270. When it is determined that the parking position of the vehicle is in the vicinity of a road, a sidewalk, or an entrance of a facility, the parking position determination unit 130 determines that the vehicle is parked at a location where people or vehicles often pass by. When the vehicle is parked at such a location, a large number of moving bodies may be detected unintentionally from the video data captured by the camera 210. Consequently, in particular, it is possible to make a more appropriate determination on a location where people or vehicles often go in and out.

Still furthermore, the parking position determination unit 130 may determine whether the vehicle is parked at a location where people or vehicles often pass close to the vehicle, on the basis of the position information of the vehicle, the map information stored in the map information storage unit 270, and status information of at least one of a congestion degree of the road, time zone, day of the week, weather, and information on an event held near the road. For example, when the parking position of the vehicle is a busy street crowded with people such as a downtown area, and when it is daytime, the parking position determination unit 130 determines that the vehicle is parked at a location where people or vehicles often pass close by. For example, when the parking position of the vehicle is a road with a heavy traffic and when it is a weekday, the parking position determination unit 130 determines that the vehicle is parked at a location where people or vehicles often pass close by. For example, when the parking position of the vehicle is a parking lot facing a busy street crowded with people such as a downtown area, and when weather is fine, the parking position determination unit 130 determines that the vehicle is parked at a location where people or vehicles often pass close by. For example, when the parking position of the vehicle is a parking lot facing a road with a heavy traffic, and when an event is held nearby, the parking position determination unit 130 determines that the vehicle is parked at a location where people or vehicles often pass close by. Consequently, according to the status information of at least one of a congestion degree of the road, time zone, day of the week, weather, and information on an event held near the road, even when the traffic volume at the location is changed, it is possible to make an appropriate determination. The parking position determination unit 130 acquires the information described above from a communication function and another device, which will not be illustrated.

Moreover, the parking position determination unit 130 may determine whether the vehicle is parked in a lighted area of a predetermined value or higher, on the basis of the position information of the vehicle, the map information stored in the map information storage unit 270, and luminance information on the surroundings of the vehicle. For example, when the parking position of the vehicle is a busy street crowded with people such as a downtown area, as well as a lighted area where the luminance is a predetermined value or higher, the parking position determination unit 130 determines that the vehicle is parked at a location where people or vehicles often pass close by. When the luminance is high, the susceptibility to vehicle theft and vandalism will be reduced. For example, even when the parking position of the vehicle is a busy street crowded with people such as a downtown area, if the parking position is a dark area having a luminance of a predetermined value or less, the vehicle is susceptible to vehicle theft and vandalism. Thus, even when the parking position of the vehicle is a busy street crowded with people such as a downtown area, if the parking position is a dark area having a luminance of a predetermined value or less, the parking position determination unit 130 does not determine that the vehicle is parked at a location where people or vehicles often pass close by. Consequently, it is possible to make an appropriate determination by the parking position and luminance. The parking position determination unit 130 acquires the information described above from a communication function, a luminance sensor, and the like, which will not be described.

The moving body detection unit 131 detects whether there is a moving body, from the video data acquired by the video data acquisition unit 120 while the vehicle is parked. More specifically, the moving body detection unit 131 detects an area where the brightness or color information is changed for each frame, in a unit of pixel or in a unit of block of a few pixels square, in the video data acquired by the video data acquisition unit 120. When the temporal change is detected in an area larger than a predetermined area or more, the moving body detection unit 131 detects the temporal change as an event.

Figure 2:
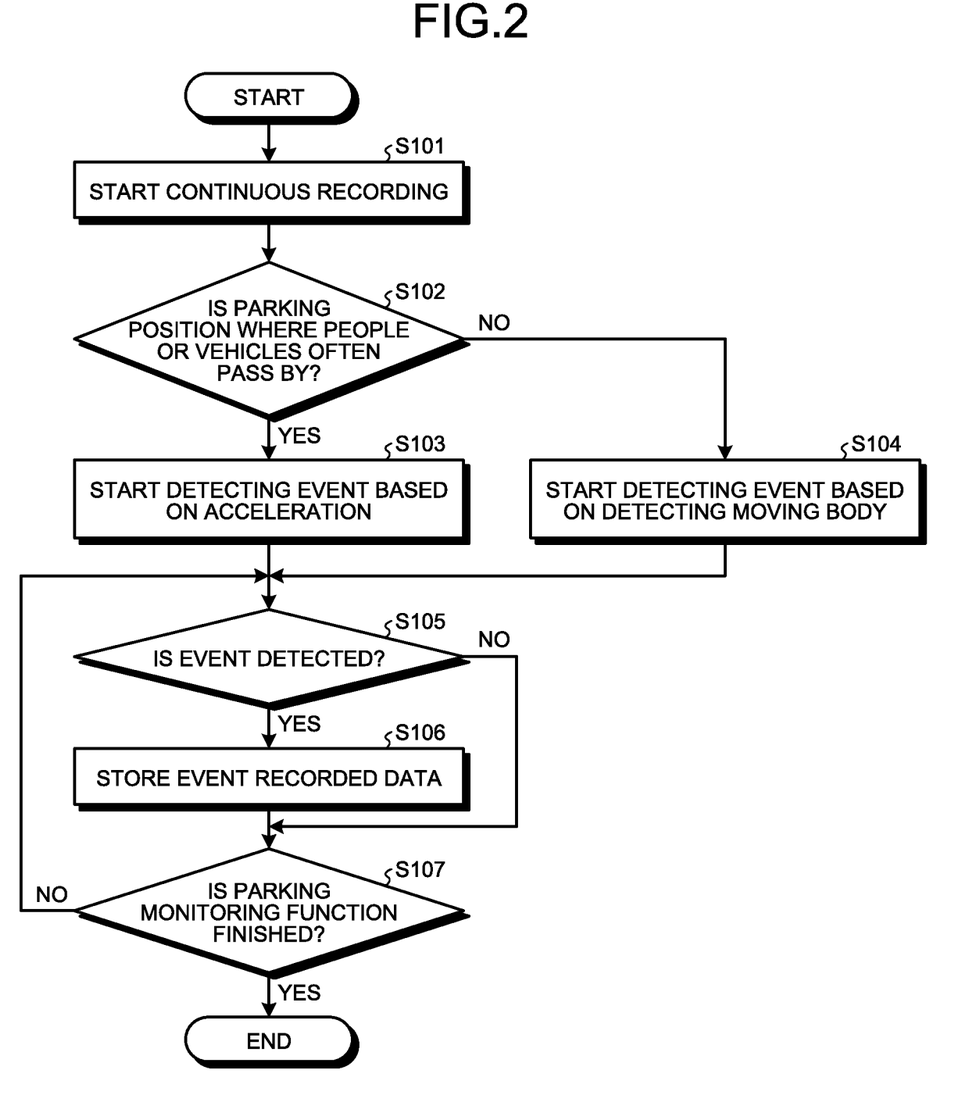
FIG. 2 is a flowchart illustrating an example of a flow of a process performed by the vehicle recording control device according to the present embodiment.

Next, with reference to FIG. 2, a flow of a process performed by the vehicle recording control device 100 will be described. FIG. 2 is a flowchart illustrating an example of a flow of a process performed by the vehicle recording control device according to the present embodiment. In the process illustrated in FIG. 2, video data of a predetermined period before and after, and including the time when the event is detected, is generated from the video data that is loop recorded upon detecting an event. The video data is then stored in the recording unit 220 as the event detected data.

While the vehicle is operated, the vehicle recording control device 100 causes the position information acquisition unit 128 to acquire the current position information of the vehicle. While the vehicle is operated, the vehicle recording control device 100 causes the parking detection unit 129 to determine whether the vehicle is in a parking state. When the parking detection unit 129 determines that the vehicle is in a parking state, the vehicle recording control device 100 performs the process in the flowchart illustrated in FIG. 2, and operates the parking monitoring function.

The vehicle is operated when the vehicle is not in the parking state, such as when power is supplied to the vehicle recording device 10 from the accessory power supply of the vehicle and the like.

When it is determined that the vehicle is in a parking state, the vehicle recording control device 100 starts continuous recording (step S101). In other words, the vehicle recording control device 100 turns ON loop recording. The vehicle recording control device 100 may also continue the continuous recording from the state when the vehicle is operated. The vehicle recording control device 100 then proceeds to step S102.

The vehicle recording control device 100 determines whether the parking position of the vehicle is a location where people or vehicles often pass by (step S102). More specifically, the vehicle recording control device 100 causes the parking position determination unit 130 to determine whether the current position of the vehicle is a place where people or vehicles often pass by such as a downtown area, on the basis of the current position information of the vehicle acquired by the position information acquisition unit 128, and the map information stored in the map information storage unit 270. When the parking position determination unit 130 determines that the parking position of the vehicle is a place where people or vehicles often pass by (Yes at step S102), the vehicle recording control device 100 proceeds to step S103. When the parking position determination unit 130 determines that the parking position of the vehicle is a place where people or vehicles seldom pass by (No at step S102), the vehicle recording control device 100 proceeds to step S104.

When it is determined that the parking position of the vehicle is a place where people or vehicles often pass by (Yes at step S102), the vehicle recording control device 100 starts detecting an event on the basis of acceleration (step S103). More specifically, on the basis of the detection result of the acceleration sensor 250, the vehicle recording control device 100 causes the acceleration detection unit 127 to start detecting an event using acceleration. The vehicle recording control device 100 then proceeds to step S105.

When it is determined that the parking position of the vehicle is a place where people or vehicles seldom pass by (No at step S102), the vehicle recording control device 100 starts detecting an event on the basis of detecting a moving body (step S104). More specifically, on the basis of the detection result of the moving body detection unit 131, the vehicle recording control device 100 causes the moving body detection unit 131 to start detecting an event by detecting a moving body. The vehicle recording control device 100 then proceeds to step S105.

On the basis of the detection result of the acceleration detection unit 127 or the moving body detection unit 131, the vehicle recording control device 100 determines whether an event is detected (step S105).

More specifically, when the acceleration detection unit 127 detects an acceleration equal to or higher than a threshold, the vehicle recording control device 100 determines that an event is detected (Yes at step S105), and proceeds to step S106. When the acceleration detection unit 127 does not detect an acceleration equal to or higher than a threshold, or when the moving body detection unit 131 does not detect a moving body, the vehicle recording control device 100 determines that an event is not detected (No at step S105), and proceeds to step S107.

When the moving body detection unit 131 detects a moving body, the vehicle recording control device 100 determines that an event is detected (Yes at step S105), and proceeds to step S106. Alternatively, when the moving body detection unit 131 does not detect a moving body, the vehicle recording control device 100 determines that an event is not detected (No at step S105), and proceeds to step S107.

When it is determined that an event is detected (Yes at step S105), the vehicle recording control device 100 causes the recording function control unit 123 to store video data of a predetermined period before and after, and including the time when the event is detected, as the event recorded data (step S106). More specifically, the vehicle recording control device 100 causes the video data processing unit 122 to generate video data of a predetermined period before and after, and including the time when the event is detected, as the event recorded data. When it is determined that a predetermined period has passed, the vehicle recording control device 100 causes the recording function control unit 123 to cause the recording unit 220 to store the event recorded data of a predetermined period before and after, and including the time when the event is detected, that is generated by the video data processing unit 122. The vehicle recording control device 100 then proceeds to step S107.

The vehicle recording control device 100 determines whether the parking monitoring function is finished (step S107). For example, the parking monitoring function is finished, when the accessory power supply is turned ON, when the parking monitoring function is stopped by the operation of the operation unit 230, and the like.

When it is determined that the parking monitoring function is finished at step S107 (Yes at step S107), the present process is finished. When it is determined that the parking monitoring function is not finished (No at step S107), the process returns to step S105.

Figure 3:
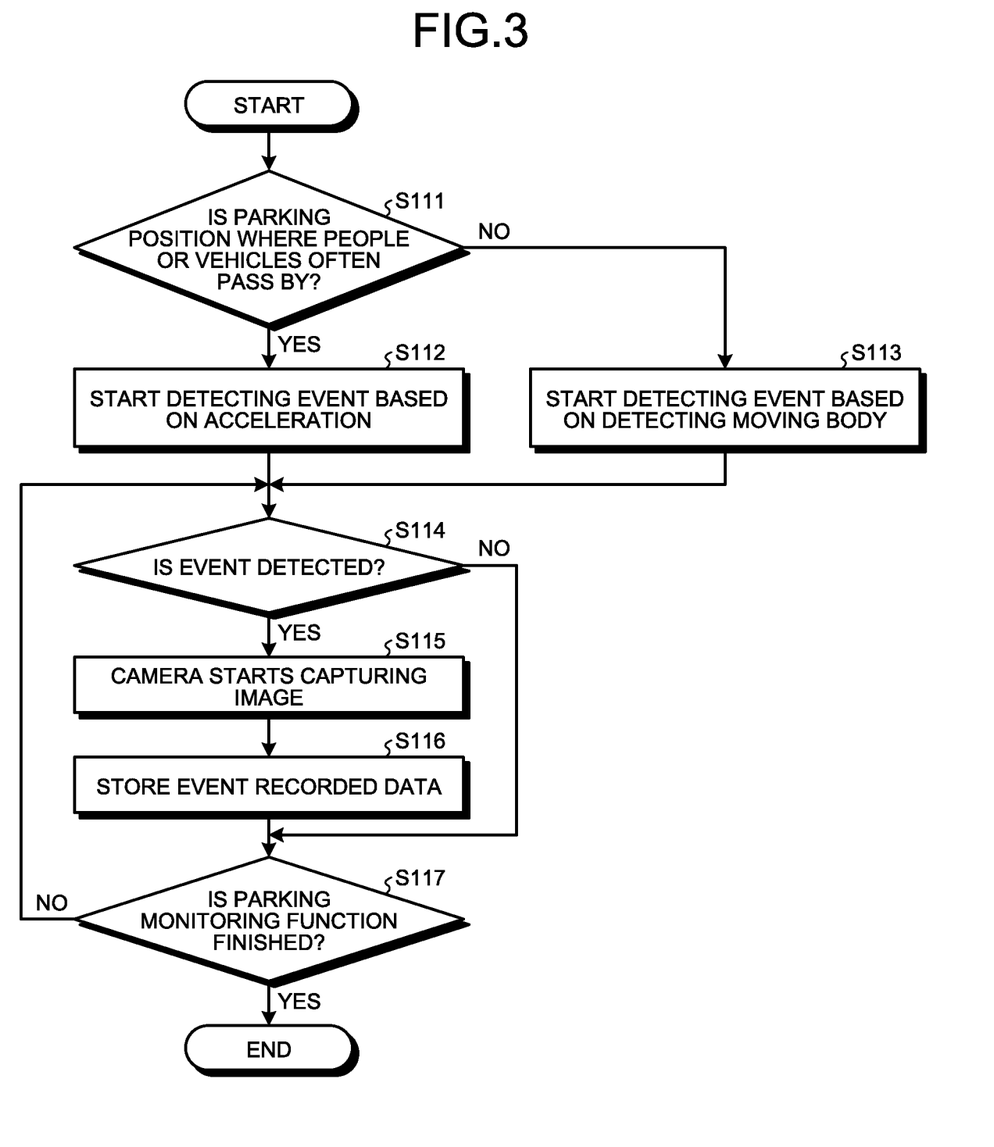
FIG. 3 is a flowchart illustrating another example of a flow of a process performed by the vehicle recording control device according to the present embodiment.

Next, with reference to FIG. 3, another example of a flow of a process performed by the vehicle recording control device 100 will be described. FIG. 3 is a flowchart illustrating another example of a flow of a process performed by the vehicle recording control device according to the present embodiment. In the process illustrated in FIG. 3, the camera 210 is activated upon detecting an event, and video data of a predetermined period after detecting the event is stored in the recording unit 220, as the event recorded data. The processes from step S111 to step S113, step S114, and step S117 in FIG. 3 are the same as the processes from step S102 to step S104, step S105, and step S107 in FIG. 2.

When it is determined that an event is detected (Yes at step S114), the vehicle recording control device 100 causes the recording function control unit 123 to cause the camera 210 to start capturing images (step S115), and proceeds to step S116.

The vehicle recording control device 100 causes the recording function control unit 123 to store the captured video data in the recording unit 220, as the event recorded data (step S116), and proceeds to step S117. The event recorded data stored at step S116 is video data of a period from when the image capturing is started at step S115, to when a predetermined period has passed and the image capturing is finished.

In this manner, when the parking position of the vehicle is a location where people or vehicles often pass by, video images are stored by detecting an event using acceleration. When the parking position of the vehicle is a location where people or vehicles seldom pass by, video images are stored by detecting an event using a moving body.

As described above, in the present embodiment, when the parking position of the vehicle is a location where people or vehicles often pass by, video images are stored by detecting an event using acceleration. In the present embodiment, when the parking position of the vehicle is a location where people or vehicles seldom pass by, video images are stored by detecting an event using a moving body. In this manner, in the present embodiment, it is possible to perform different parking recording functions by changing a detection method of an event, depending on whether the parking position of the vehicle is a location where people or vehicles often pass by, or a location where people or vehicles seldom pass by.

With the present embodiment, at the parking position where people or vehicles often pass by, and where a large number of moving bodies will be detected, the event recorded data can be stored by detecting an event using acceleration. With the present embodiment, it is possible to suppress the recording capacity from becoming insufficient due to detecting events unintentionally and storing a large number of the event recorded data. Moreover, with the present embodiment, it is possible to reduce the risk of the event recorded data to be originally recorded from not being stored, due to insufficient recording capacity.

At the parking position where people or vehicles seldom pass by, the vehicle is susceptible to vehicle theft and vandalism, compared to the parking position where people or vehicles often pass by. With the present embodiment, at the parking position where people or vehicles seldom pass by, the event recorded data can be stored by detecting an event through the detection of a moving body. With the present embodiment, it is possible to store video images upon detecting a moving body close to the vehicle, instead of storing video images after acceleration is detected such as when the vehicle is damaged. Moreover, at the parking position where people or vehicles seldom pass by, a large number of moving bodies will not be detected. Consequently, the present embodiment can suppress the recording capacity of video data to be stored.

Moreover, in the present embodiment, when a location where people or vehicles often pass by is placed in the image capturing direction of the camera 210, the event recorded data is stored by detecting an event using acceleration. With the present embodiment, it is possible to suppress a large number of events from being detected unintentionally, and suppress a large number of unnecessary event recorded data from being recorded. Furthermore, in the present embodiment, when a location where people or vehicles often pass by is placed in a direction different from the image capturing direction of the camera 210, and when not many people are watching in the image capturing direction of the camera 210, the event recorded data can be stored by detecting an event through the detection of a moving body. With the present embodiment, it is possible to record video images more properly, by taking the image capturing direction of the camera 210 into consideration.

Still furthermore, in the present embodiment, when the parking position of the vehicle is in the vicinity of a road, a sidewalk, or an entrance of a facility, it is possible to store video images by detecting an event using acceleration.

Still furthermore, in the present embodiment, when it is determined that the parking position of the vehicle is a location where people or vehicles often pass by, according to the status of at least one of a congestion degree of the road, time zone, day of the week, weather, and information on the event held near the road, it is possible to store the event recorded data by detecting an event using acceleration.

Still furthermore, in the present embodiment, when the parking position of the vehicle is a busy street crowded with people such as a downtown area, as well as a lighted area where the luminance is a predetermined value or higher, it is possible to store the event recorded data by detecting an event using acceleration. For example, even when the parking position of the vehicle is a busy street crowded with people such as a downtown area, if the parking position is a dark area having a luminance of a predetermined value or less, it is possible to store the event recorded data by detecting an event through the detection of a moving body.

In this manner, with the present embodiment, it is possible to record video images properly, while a vehicle is parked.

The vehicle recording device 10 according to the present disclosure may be implemented in various other modifications in addition to the embodiments described above.

The components of the vehicle recording device 10 illustrated in the drawings are functionally conceptual, and need not necessarily be physically configured as illustrated. In other words, the specific modes of the devices are not limited to those illustrated in the drawings, and all or a part thereof may be functionally or physically dispersed or integrated in an optional unit according to the processing load or usage status of each device.

For example, the component of the vehicle recording device 10 may be implemented as a computer program loaded in the memory, as software. In the embodiments described above, the components are described as functional blocks implemented by the cooperation of hardware and software. In other words, these functional blocks can be implemented in various forms by hardware alone, software alone, or a combination thereof.

The components described above include components that can be easily assumed by a person skilled in the art, and components that are substantially the same. Moreover, the components described above can be combined as appropriate. Furthermore, various omissions, replacements, and changes may be made without departing from the spirit of the present disclosure.

The present disclosure has been made in view of the above, and an object of the present disclosure is to properly record video images while a vehicle is parked.

The present disclosure can properly record video images while a vehicle is parked.

What is claimed is:

1. A vehicle recording control device, comprising:
   a video data acquisition unit that acquires video data captured by an image capturing unit for capturing an image of a surrounding of a vehicle;
   a parking detection unit that detects whether the vehicle is parked;
   a moving body detection unit that detects a moving body from the video data acquired by the video data acquisition unit while the vehicle is parked;
   an acceleration detection unit that detects acceleration applied to the vehicle;
   a parking position determination unit that determines whether the vehicle is parked at a location where people or vehicles often pass close to the vehicle, based on position information of the vehicle, and
   a recording function control unit that selectively performs a process of storing video data based on detection of a moving body by the moving body detection unit, and a process of storing video data based on acceleration detected by the acceleration detection unit, according to a determination result of the parking position determination unit.

2. The vehicle recording control device according to claim 1, wherein
the recording function control unit performs a process of storing video data based on the detection of a moving body by the moving body detection unit, when the parking position determination unit determines that the vehicle is parked at a position other than a location where people or vehicles often pass close to the vehicle, and
the recording function control unit performs a process of storing video data based on acceleration detected by the acceleration detection unit, when the parking position determination unit determines that the vehicle is parked at a location where people or vehicles often pass close to the vehicle.

3. The vehicle recording control device according to claim 1, wherein the parking position determination unit determines whether the vehicle is parked at a location where people or vehicles often pass in an image capturing direction of the image capturing unit, based on position information and parking direction information of the vehicle.

4. The vehicle recording control device according to claim 1, wherein the parking position determination unit determines whether the vehicle is parked in a vicinity of a road, a sidewalk, or an entrance of a facility.

5. The vehicle recording control device according to claim 1, wherein the parking position determination unit determines whether the vehicle is parked at a location where people or vehicles often pass close to the vehicle, based on the position information of the vehicle, and status information of at least one of a congestion degree of a road, time zone, day of week, weather, and information of an event held near the road.

6. The vehicle recording control device according to claim 1, wherein the parking position determination unit determines whether the vehicle is parked in a lighted area of a predetermined value or higher, based on luminance information on a surrounding of the vehicle.

7. A vehicle recording device, comprising:
the vehicle recording control device according to claim 1; and
at least one of an image capturing unit that captures an image of a surrounding of a vehicle, and a recording unit that stores video data.

8. A vehicle recording control method, comprising:
a step of detecting parking that detects whether a vehicle is parked;
a step of determining parking position that determines whether the vehicle is parked at a location where people or vehicles often pass close to the vehicle, based on position information of the vehicle; and
a step of controlling recording function that selectively performs a process of storing video data based on detection of a moving body from video data obtained by capturing an image of a surrounding of the vehicle, and a process of storing video data based on detecting acceleration applied to the vehicle, according to a determination result at the step of determining parking position.

9. A non-transitory computer readable recording medium storing therein a computer program that causes a computer operating as a vehicle recording control device to execute:
a step of detecting parking that detects whether a vehicle is parked;
a step of determining parking position that determines whether the vehicle is parked at a location where people or vehicles often pass close to the vehicle, based on position information of the vehicle; and
a step of controlling recording function that selectively performs a process of storing video data based on detection of a moving body from video data obtained by capturing an image of a surrounding of the vehicle, and a process of storing video data based on detecting acceleration applied to the vehicle, according to a determination result at the step of determining parking position.

* * * * *